(12) United States Patent
Johnson

(10) Patent No.: US 10,843,517 B2
(45) Date of Patent: Nov. 24, 2020

(54) ISOLATED LIFT ASSEMBLY FOR VEHICLE AUXILIARY SUSPENSION ARRANGEMENT

(71) Applicant: SAF-HOLLAND, Inc., Muskegon, MI (US)

(72) Inventor: Marc R. Johnson, Muskegon, MI (US)

(73) Assignee: SAF-HOLLAND, Inc., Muskegon, MI (US)

( * ) Notice: Subject to any disclaimer, the term of this patent is extended or adjusted under 35 U.S.C. 154(b) by 255 days.

(21) Appl. No.: 15/913,273

(22) Filed: Mar. 6, 2018

(65) Prior Publication Data

US 2018/0272818 A1 Sep. 27, 2018

Related U.S. Application Data

(60) Provisional application No. 62/477,170, filed on Mar. 27, 2017.

(51) Int. Cl.
*B62D 61/12* (2006.01)
*B60G 3/26* (2006.01)
(Continued)

(52) U.S. Cl.
CPC .......... *B60G 3/26* (2013.01); *B60G 3/20* (2013.01); *B60G 11/27* (2013.01); *B60G 17/00* (2013.01); *B60G 17/005* (2013.01); *B62D 61/12* (2013.01); *B60G 2200/13* (2013.01); *B60G 2200/144* (2013.01); *B60G 2200/40* (2013.01); *B60G 2202/152* (2013.01); *B60G 2204/40* (2013.01); *B60G 2204/4702* (2013.01); *B60G 2300/02* (2013.01)

(58) Field of Classification Search
CPC combination set(s) only.
See application file for complete search history.

(56) References Cited

U.S. PATENT DOCUMENTS 4,202,276 A * 5/1980 Browne .................. B60F 1/046
　　　　　　　　　　　　　　　　　　　　　　　　　　　　 105/165
4,311,244 A * 1/1982 Hindin .................... B60D 1/02
　　　　　　　　　　　　　　　　　　　　　　　　　　　　 105/215.2

(Continued)

FOREIGN PATENT DOCUMENTS

EP　　　　　401100 A1 * 12/1990
EP　　　　　0450942　　　 9/1995
(Continued)

*Primary Examiner* — Nicole T Verley
(74) *Attorney, Agent, or Firm* — Price Heneveld LLP

(57) ABSTRACT

A vehicle suspension assembly includes a mounting bracket adapted to couple to a vehicle frame assembly, a trailing arm having a first end pivotably coupled to the first mounting bracket, and a second end, an axle member coupled to the second end of the trailing arm, the axle member configured to support a tire, an actuator operably coupled to the trailing arm and operable between a first state configured to lift the tire away from a ground surface and a second state configured for the tire to contact the ground surface, and an actuator arrangement configured to move from a first position where the actuator arrangement couples the actuator to the trailing arm when the actuator is in the first state, and a second position where the actuator arrangement uncouples the actuator from the trailing arm when the actuator is in the second state.

31 Claims, 7 Drawing Sheets

(51) Int. Cl.
*B60G 17/00* (2006.01)
*B60G 17/005* (2006.01)
*B60G 3/20* (2006.01)
*B60G 11/27* (2006.01)

(56) References Cited

U.S. PATENT DOCUMENTS

| | | | | |
|---|---|---|---|---|
| 4,316,418 A | * | 2/1982 | Hindin | B60F 1/046 |
| | | | | 105/165 |
| 5,058,916 A | * | 10/1991 | Hicks | B60F 1/046 |
| | | | | 180/209 |
| 5,058,917 A | * | 10/1991 | Richardson | B60F 1/046 |
| | | | | 105/215.2 |
| 5,090,495 A | * | 2/1992 | Christenson | B60G 5/04 |
| | | | | 180/209 |
| 5,192,101 A | * | 3/1993 | Richardson | B60G 11/26 |
| | | | | 180/209 |
| 5,332,258 A | * | 7/1994 | Buttner | B60G 11/465 |
| | | | | 180/209 |
| 5,655,788 A | * | 8/1997 | Peaker | B60G 11/465 |
| | | | | 280/86.5 |
| 6,182,984 B1 | * | 2/2001 | Chalin | B60G 7/006 |
| | | | | 280/86.751 |
| 6,880,839 B2 | * | 4/2005 | Keeler | B62D 61/12 |
| | | | | 280/124.153 |
| 6,994,358 B2 | * | 2/2006 | Roycroft | B60F 3/00 |
| | | | | 180/209 |
| 7,854,436 B2 | * | 12/2010 | Hock | B60G 11/27 |
| | | | | 280/86.5 |
| 8,226,098 B2 | * | 7/2012 | VanDenberg | B60G 3/145 |
| | | | | 280/124.106 |
| 8,967,639 B2 | * | 3/2015 | Conaway | B60G 9/02 |
| | | | | 280/86.5 |
| 2004/0178594 A1 | * | 9/2004 | Keeler | B62D 61/12 |
| | | | | 280/86.5 |
| 2012/0126504 A1 | | 5/2012 | Piehl et al. | |
| 2015/0197130 A1 | * | 7/2015 | Smith | B60G 11/46 |
| | | | | 280/124.175 |
| 2016/0318567 A1 | | 11/2016 | Conaway et al. | |

FOREIGN PATENT DOCUMENTS

| | | | | |
|---|---|---|---|---|
| EP | 2647512 A2 | * | 10/2013 | B62D 61/12 |
| EP | 2873596 A1 | * | 5/2015 | B60G 9/003 |
| WO | WO-2016022024 A1 | * | 2/2016 | B60G 11/12 |

* cited by examiner

ISOLATED LIFT ASSEMBLY FOR VEHICLE AUXILIARY SUSPENSION ARRANGEMENT

CROSS-REFERENCE TO RELATED APPLICATIONS

This application claims priority to U.S. Provisional Patent Application No. 62/477,170, filed Mar. 27, 2017, entitled "ISOLATED LIFT ASSEMBLY FOR VEHICLE AUXILIARY SUSPENSION ARRANGEMENT," the entire disclosure of which is incorporated herein by reference.

BACKGROUND OF THE INVENTION

The present invention relates to heavy-duty vehicle suspensions and assemblies, and particularly to suspension assemblies incorporating a trailing arm-type configuration. More particularly, the present invention relates to an auxiliary vehicle suspension assembly that includes a lift assembly for operating an auxiliary suspension arrangement between an in use position and a stored position, wherein the lift assembly is isolated from an associated axle assembly when the auxiliary suspension arrangement is in the stored position.

BRIEF SUMMARY OF THE INVENTION

One aspect of the present invention is a vehicle suspension assembly that includes a first mounting bracket adapted to couple to a vehicle frame assembly, a first trailing arm having a first end pivotably coupled to the first mounting bracket, and a second end, a second mounting bracket adapted to couple to a vehicle frame assembly, and a second trailing arm having a first end pivotably coupled to the second mounting bracket, and a second end. The present invention further includes an axle member having a first end operably coupled to the second end of the first trailing arm and a second end operably coupled to the second end of the second trailing arm, the axle member configured to support a tire, and a pneumatic actuator operably coupled to at least one of the first trailing arm and the second trailing arm and operable between an inflated position configure to lift the tire away from a ground surface and a deflated position configured for the tire to contact the ground surface. The present invention still further includes a lever arm operably coupling the pneumatic actuator and the at least one of the first trailing arm and the second trailing arm, wherein the lever arm abuts the at least one of the first trailing arm and the second trailing arm when the pneumatic actuator is in the inflated position, and wherein the lever arm is spaced from the at least one of the first trailing arm and the second trailing arm when the pneumatic actuator is in the deflated position thereby decoupling the pneumatic actuator from the at least one of the first trailing arm and the second trailing arm when the pneumatic actuator is in the deflated position.

Another aspect of the present invention includes a vehicle suspension assembly that includes a mounting bracket adapted to couple to a vehicle fame assembly, a trailing arm having a first end pivotably coupled to the first mounting bracket, and a second end, an axle member coupled to the second end of the trailing arm, the axle member configured to support a tire, an actuator operably coupled to the trailing arm and operable between a first state configured to lift the tire away from a ground surface and a second state configured for the tire to contact the ground surface, and an actuator arrangement configured to move from a first position where the actuator arrangement couples the actuator to the trailing arm when the actuator is in the first state, and a second position where the actuator arrangement uncouples the actuator from the trailing arm when the actuator is in the second state.

Still another aspect of the present invention includes a vehicle suspension assembly that includes an attachment member adapted to couple to a vehicle frame assembly, a support member having a first portion coupled to the attachment member, and a second portion, an axle member coupled to the second portion of the support member, the axle member configured to support a tire, an actuator operably coupled to the support member and operable between a first state configured to lift the tire away from a ground surface and a second state configured for the tire to contact the ground surface, and an actuator arrangement configured to move from a first position where the actuator arrangement couples the actuator to the support member when the actuator is in the first state, and a second position where the actuator arrangement uncouples the actuator from the support member when the actuator is in the second state such that vertical movement of the axle member is not transmitted to the actuator when the actuator arrangement is in the second position.

The present inventive vehicle suspension assembly provides a durable, uncomplicated design that can be easily and quickly assembled, while simultaneously reducing manufacturing costs. The invention is efficient in use, economical to manufacture, capable of a long operating life, and is particularly well adapted for the proposed use.

These and other features, advantages, and objects of the present invention will be further understood and appreciated by those skilled in the art by reference to the following specification, claims, and appended drawings.

DETAILED DESCRIPTION

Figure 1:
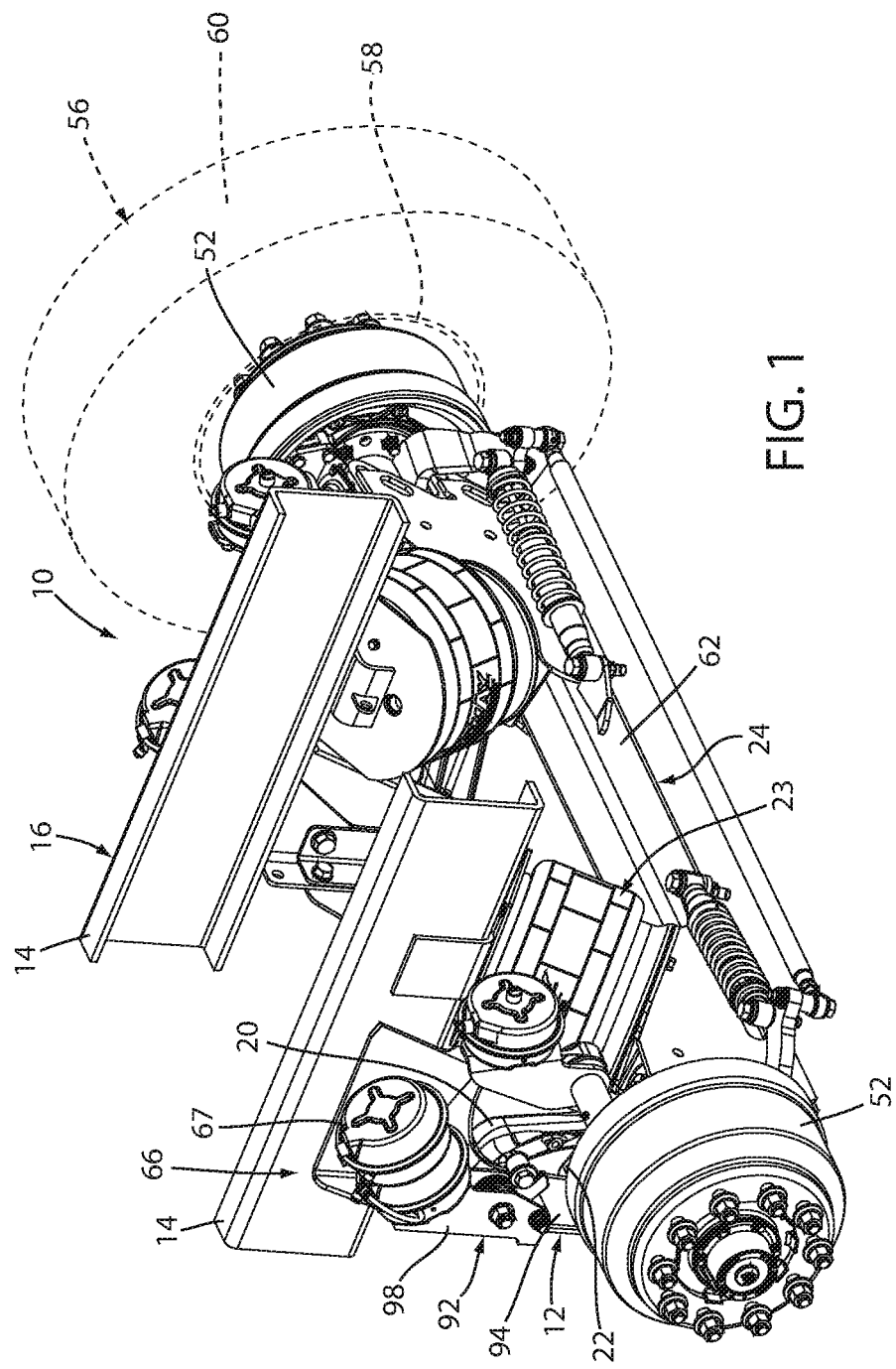
FIG. 1 is a rear perspective view of a suspension arrangement embodying the present invention.
Figure 2:
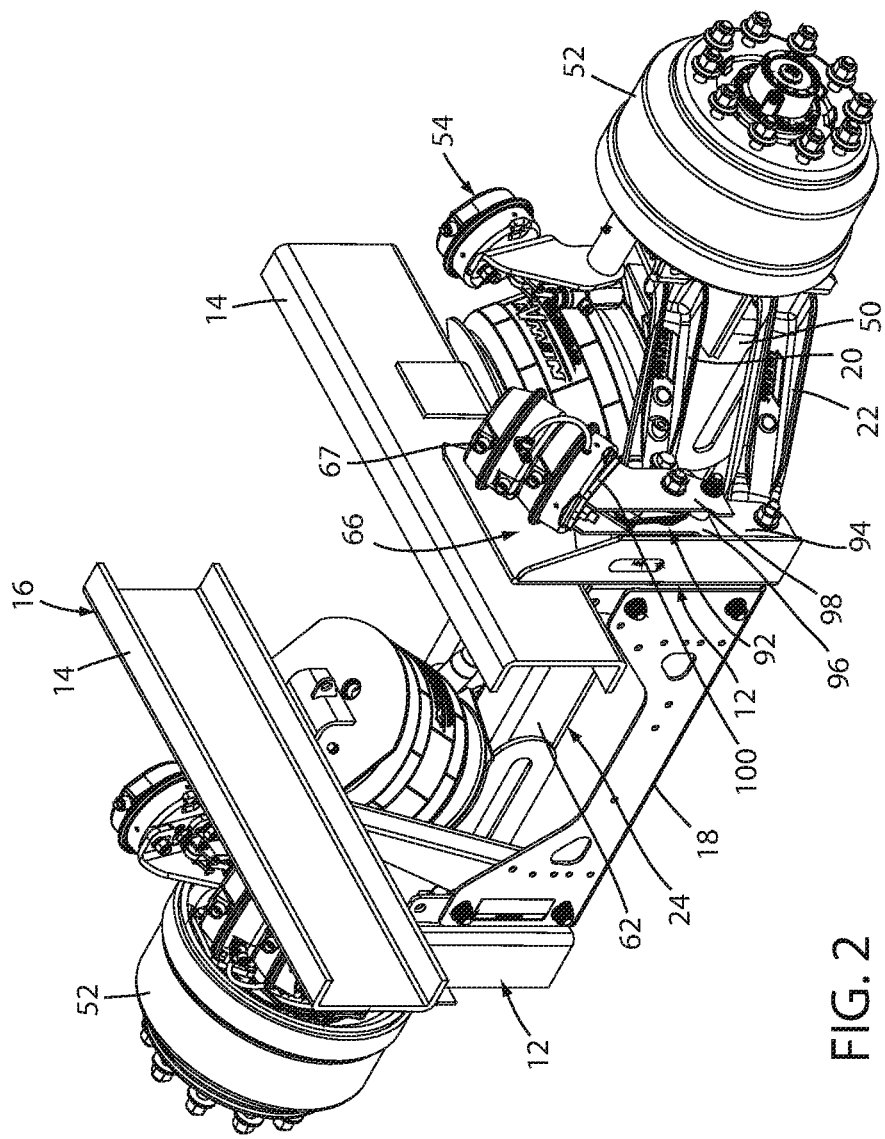
FIG. 2 is a front perspective view of the suspension arrangement.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

A suspension assembly 10 (FIGS. 1 and 2) comprises a pair of mounting brackets 12 fixedly connected to a pair of longitudinally-extending frame members 14 of a vehicle frame assembly 16 by a plurality of mechanical fasteners (not shown) and coupled to one another by a cross member 18, a plurality of trailing arm assemblies including a pair of upper trailing arms 20 (FIG. 3) and a pair of lower trailing arms 22, an axle assembly 24, and a pair of air spring assemblies 23 extending between the axle assembly 24 and the corresponding frame members 14.

In the illustrated example, each upper trailing arm 20 (FIGS. 3 and 4) includes a first end 26 pivotably coupled to one of the mounting brackets 12 via a bushing arrangement 28 for rotation about a pivot axis 30 and a second end 32 pivotably coupled to the axle assembly 24 via a bushing arrangement 33 for rotation about a pivot axis 34, as described below. Each lower trailing arm 22 includes a first end 36 secured to the mounting bracket 12 via a bushing arrangement 38 for pivoting about a pivot axis 40, and a second end 42 pivotably coupled via a bushing arrangement 44 to the axle assembly 24 for pivotable movement about a pivot axis 46, also as described below. FIGS. 1 and 4 illustrate the generally outward-sweeping shape of the trailing arms 20, 22 along the length of the trailing arms 20, 22 from the first end 26, 36 to the second end 32, 42. Each bushing arrangement 28, 33, 38, 44 comprise an elastically resilient bushing member, a bushing pin and nylon washers received within a corresponding bore.

The second end 32, 42 of each upper trailing arm 20 and lower trailing arm 22 are pivotably coupled to the axle assembly 24 via an integrated corresponding mounting arrangement 50. The mounting arrangement 50 is described in detail in currently pending U.S. patent application Ser. No. 15/205,711, entitled Auxiliary Axle and Suspension Assembly, the entire contents of which are incorporated herein by reference. The mounting arrangement 50 provides a coupling interface between the second end 32, 42 of the upper trailing arm 20 and lower trailing arm 22, associated spindle arrangements (not shown) to support the hub assemblies 52, and the air spring assemblies 23. The hub assemblies 52, associated braking assemblies 54 and wheel assemblies 56, including wheels 58 and tires 60, are coupled to each spindle (not shown). The outwardly-sweeping configuration of the trailing arms 20, 22 in conjunction with the configuration and construction of the mounting arrangements 50, provides for attachment of the trailing arms 20, 22 to the spindles (not shown) the air spring assemblies 23 in close proximity to one another and in close proximity to the ends of the axle member 62 of the axle assembly 24.

Figure 3:
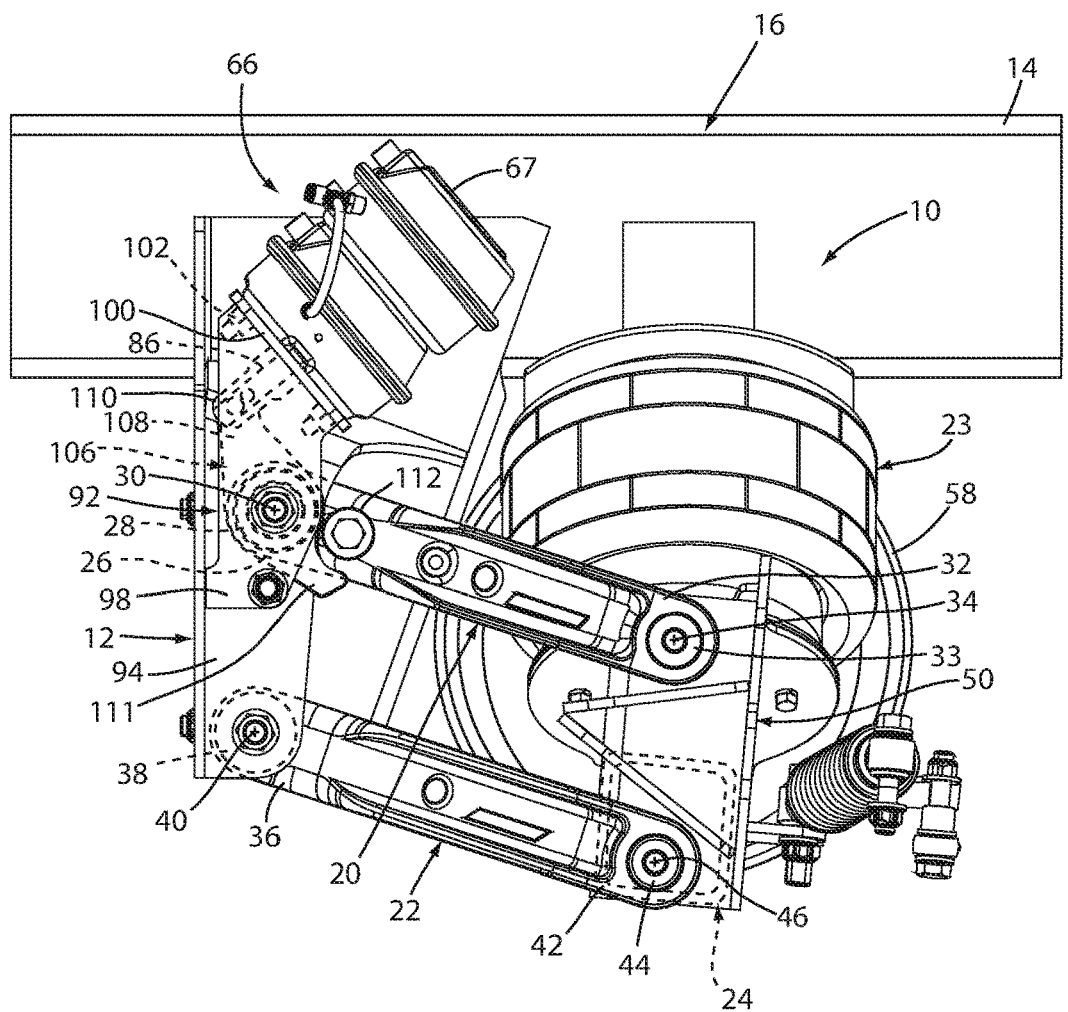
FIG. 3 is a side elevational view of the suspension arrangement.
Figure 4:
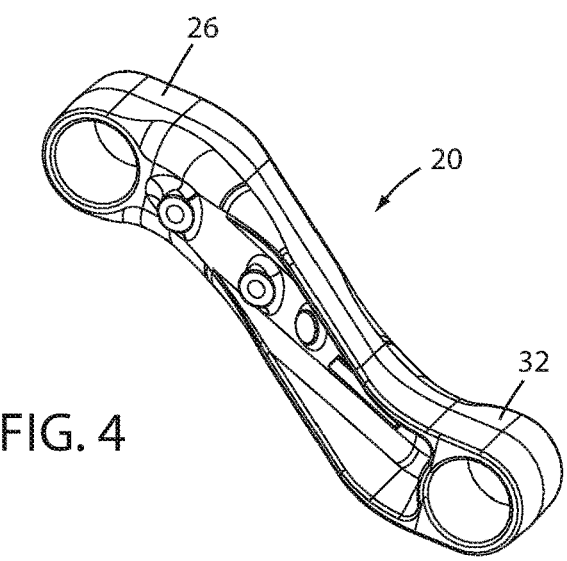
FIG. 4 is a perspective view of a trailing arm.
Figure 5:
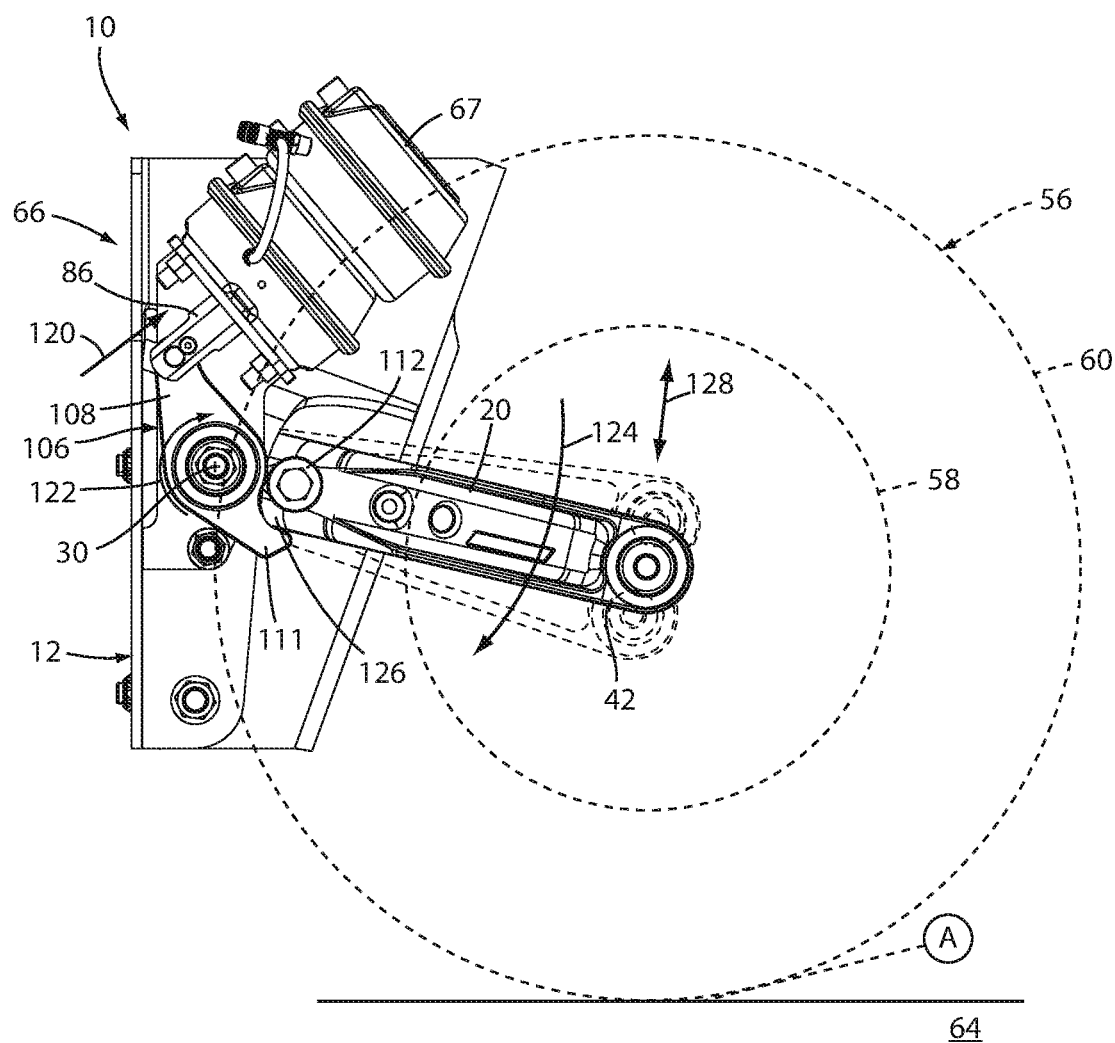
FIG. 5 is a side elevational view of the suspension arrangement in an in use position.
Figure 6:
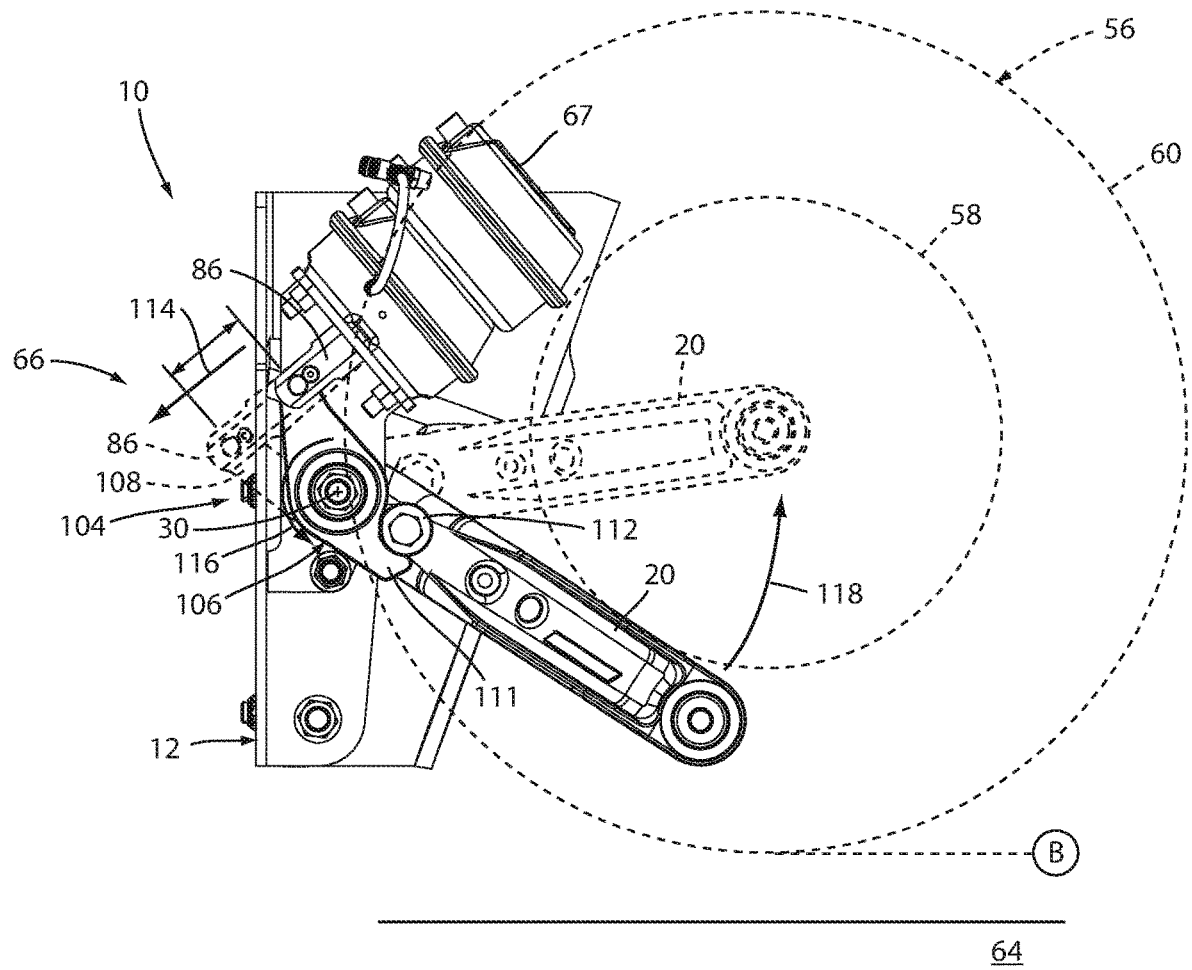
FIG. 6 is a side elevational view of the suspension arrangement in a lowered position in solid line and in a raised position in dashed line.
Figure 7:
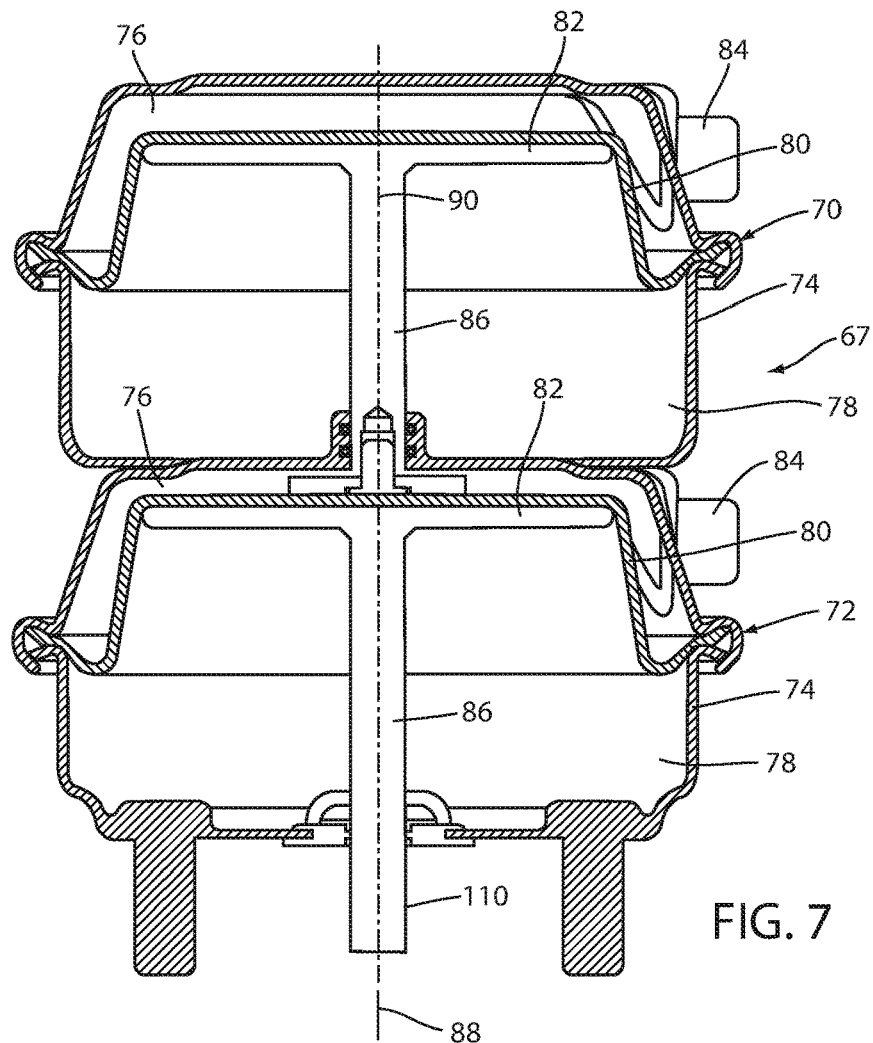
FIG. 7 is a cross-sectional view of a dual-diaphragm chamber assembly.

As best illustrated in FIGS. 3, 5 and 6, the vehicle suspension assembly 10 is a vertically adjustable. Specifically, the axle assembly 24 is movable from a lowered position A as shown in FIG. 5, wherein the tires 60 contact a ground surface 64, thereby assisting in supporting the load of the vehicle, and a raised position B as shown in FIG. 6, wherein the tires 60 are spaced from the ground surface 64, thereby reducing tire wear and fuel consumption. The vehicle suspension assembly 10 includes a pair of lift arrangements 66 operably coupled with the associated trailing arms 20 and mounting brackets 12. Each lift arrangement 66 includes a pneumatic actuator, which in the illustrated example includes a dual diaphragm chamber assembly 67 (FIG. 7) including a first diaphragm chamber 70 and a second diaphragm chamber 72. Each diaphragm chamber 70, 72 includes a housing 74 divided into an upper chamber 76 and a lower chamber 78 by a deformable diaphragm 80 and a push plate 82, wherein the upper chamber 76 may be pressurized via an air inlet 84. Each push plate 82 is secured to a pushrod 86 such that the pushrods 86 are each forced in a direction 88 as the upper chamber 76 is pressurized. It is noted that in the illustrated example, the longitudinal axis 90 of each of the pushrods 88 are aligned with one another. It is further noted that the dual pushrods 86 may be replaced by a single pushrod that extends through both the first diaphragm chamber 70 and the second diaphragm chamber 72. While a pneumatic actuator is shown in the illustrated examples and described herein, other actuators may also be utilized, including electric motors, gearing arrangements, and the like.

The lift arrangement 66 further includes a mounting member 92 (FIGS. 1-3) that mounts the diaphragm chamber assembly 67 to an outer wall 94 of the associated mounting bracket 12. In the illustrated example, the mounting member 92 includes an inner wall 96 mounted to the outer wall of the mounting bracket 12, an outer wall 98 and an upper wall 100 extending between the inner wall 96 and the outer wall 98 to which the diaphragm chamber assembly 67 is mounted via a plurality of mechanical fasteners 102.

Each lift arrangement 66 further includes an actuator 104 operably coupled to the diaphragm chamber assembly 67. In the illustrated example, the actuator 104 includes a lever arm 106 having a first end 108 pivotably coupled to an end 110 of the pushrod 86 of the diaphragm chamber assembly 67, and a second end 111 configured to abut a lug 112 extending outwardly from the upper trailing arm 20. It is noted that the lug 112 may be formed integrally with the trailing arm 20 or separately therefrom. The lever arm 106 is configured so as to couple and uncouple the lift arrangement 66 from the upper trailing arm 20 depending upon whether the axle assembly 24 is in the lowered position A or the raised position B. In the raised position B (as shown in FIG. 6), the diaphragm chamber assembly 67 is pressurized such that the pushrod 86 is actuated in a direction 114, thereby causing the lever arm 106 to pivot about the pivot axis 30 in a direction 116 until the second end 111 abuts the lug 112, thereby in turn forcing the trailing arm 20 in the direction 118 until the tire 60 is lifted from engagement with the ground surface 64. The lift arrangement 66 remains in this position thereby preventing the tire 60 from engaging the ground surface 64 until the auxiliary suspension arrangement 10 is required to support the load of the vehicle. Once the load being supported by the vehicle exceeds a certain limit, or other operating parameters are reached, the diaphragm chamber assembly 67 is actuated so that the pushrod 86 is actuated in a direction 120 thereby causing the lever arm 106 to rotate in the direction 122, thereby allowing the trailing arm 20 to rotate in a direction 124 until the tire 60 abuts the ground surface 64. As best illustrated in FIG. 5, the second end 111 of the lever arm 106 is spaced from the lug 112 such that a gap 126 is formed therebetween. This gap 126 allows the trailing arm 20 to pivot about to the pivot axis 30 and the second end 42 to move in a vertical direction 128 without transmitting the vertical movement of the trailing arm 20 to the lift arrangement 66. The decoupling of the lifting arrangement 66 from the trailing arm 20 reduces the forces exerted on the lift arrangement 66 and the resulting mechanical wear to the lift arrangement 66 and the components thereof, thereby reducing the potential of a failure and increasing the operating life thereof.

Figure 8:
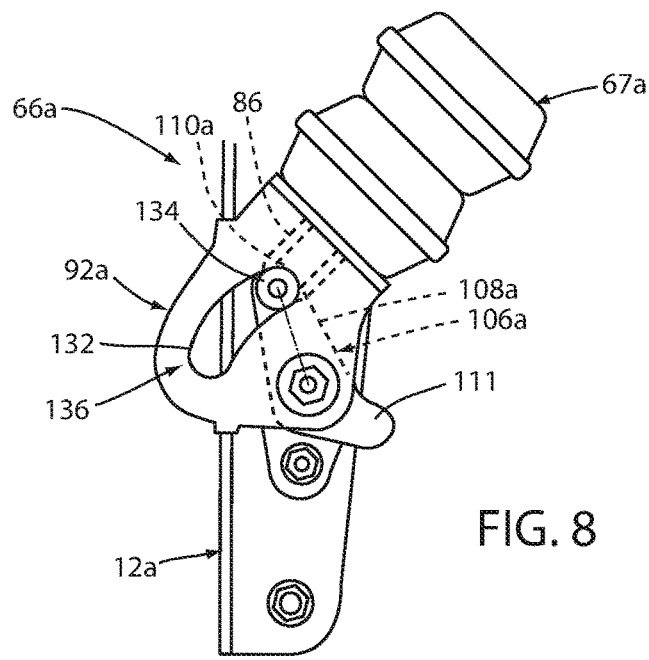
FIG. 8 is a side elevational view of an alternative embodiment of a mounting member.
Figure 10:
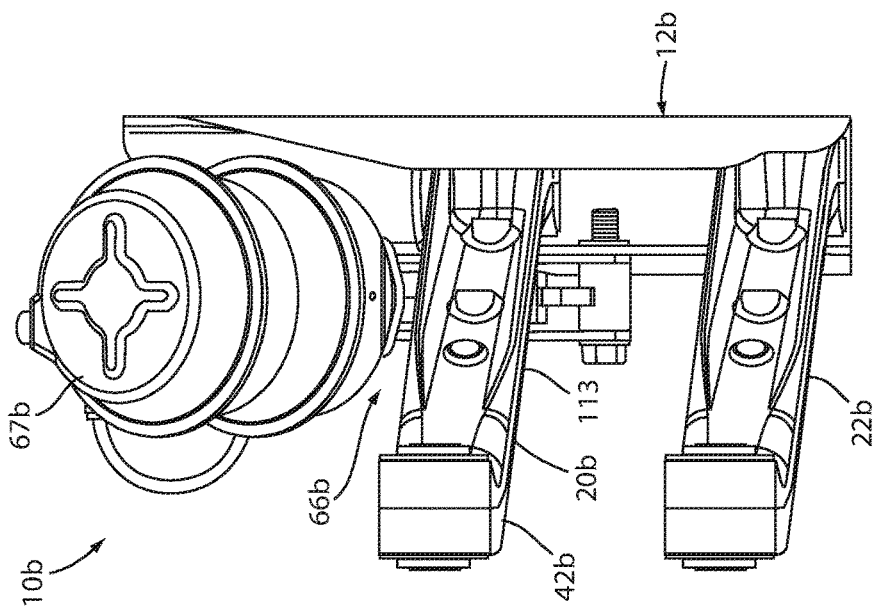
FIG. 10 is an end elevational view of the alternative embodiment of the actuator.

In an alternative embodiment (FIG. 8) the mounting member 92a may be provided with a stop arrangement 136 that limits the overall travel of the assembly between the fully lowered position A and the fully raised position B. The reference numeral 66a (FIG. 8) generally designates the alternative embodiment of the lift arrangement. Since the lift arrangement 66a is similar to the previously described lift arrangement 66, similar parts appearing in FIGS. 1-7 and FIG. 8, respectively, represent the same, corresponding reference, except for the suffix "a" in the numerals of the latter. In the illustrated example, the mounting member 92a is provided with an arcuately-shaped relief that receives a stop portion 134 fixedly attached to the first end 108a of the lever arm 106a such that the stop portion 134 tracks along the relief 132 thereby limiting the overall travel of the end 110a of the pushrod 86 and the second end 108a of the lever arm 106a.

Figure 9:
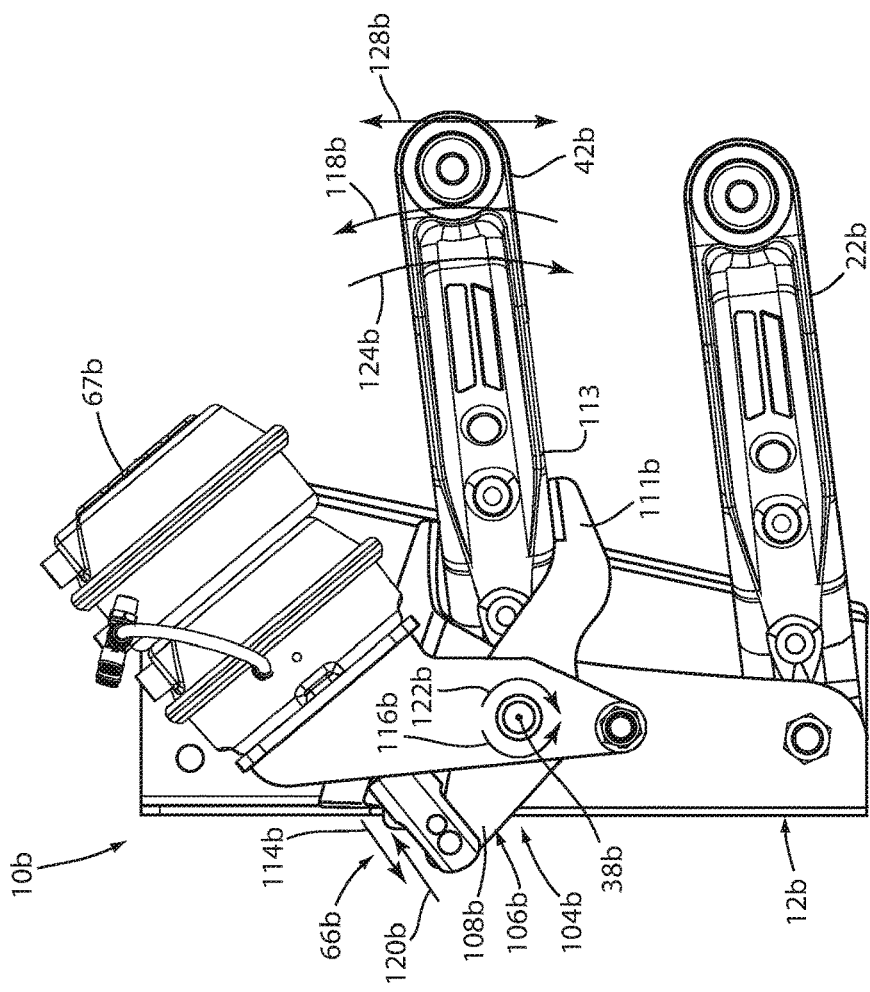
FIG. 9 is a side elevational view of an alternative embodiment of an actuator.

The reference numeral 104b (FIG. 9) generally designates an alternative embodiment of the actuator. Since the actuator 104b is similar to the previous described actuator, similar parts appearing in FIGS. 1-7 and FIGS. 9 and 10 respectively, are represented by the same, corresponding reference numeral, except for the suffix "b" in the numerals of the latter. In the illustrated example, each lift arrangement 66b further includes an actuator 104b operably coupled to the diaphragm chamber assembly 67b. In the illustrated example, the actuator 104b includes a lever arm 106b having a first end 108b pivotably coupled to an end 110b of the pushrod 86b (not shown) of the diaphragm chamber assembly 67b, and a second end 111b configured to abut an underside 113 of the upper trailing arm 20b. The lever arm 106b is configured so as to couple and uncouple the lift arrangement 66b from the upper trailing arm 20b depending upon whether the axle assembly 24b is in the lowered position or the raised position. In the raised position, the diaphragm chamber assembly 67b is pressurized such that the pushrod 86b is actuated in a direction 114b, thereby causing the lever arm 106b to pivot about the pivot axis 30b in a direction 116b until the second end 111b abuts the underside 113 of the trailing arm 20b, thereby in turn forcing the trailing arm 20b in the direction 118b until the associated tire (not shown) is lifted from engagement with the ground surface. The lift arrangement 66b remains in this position thereby preventing the tire from engaging the ground surface until the auxiliary suspension arrangement 10b is required to support the load of the vehicle. Once the load being supported by the vehicle exceeds a certain limit, or other operating parameters are reached, the diaphragm chamber assembly 67b is actuated so that the pushrod 86b is actuated in a direction 120b thereby causing the lever arm 106b to rotate in the direction 122b, thereby allowing the trailing arm 20b to rotate in a direction 124b until the tire abuts the ground surface. In the lowered position, the second end 111b of the lever arm 106b is spaced from the underside 113 of the trailing arm 120b such that a gap is formed therebetween. This gap allows the trailing arm 20b to pivot about to the pivot axis 30b and the second end 42b to move in a vertical direction 128b without transmitting the vertical movement of the trailing arm 20b to the lift arrangement 66b. The decoupling of the lifting arrangement 66b from the trailing arm 20b reduces the forces exerted on the lift arrangement 66b and the resulting mechanical wear to the lift arrangement 66b and the components thereof, thereby reducing the potential of a failure and increasing the operating life thereof.

In the examples illustrated herein, the vehicle suspension assembly 10 comprises a self-steer assembly which pivots the spindles (not shown) and the supported tires between an in-line orientation and a turning orientation. While the illustrated example includes a self-steer assembly, the present invention may be utilized with non-self-steer assemblies or any suitable suspension arrangement including trailing arm type suspensions, leaf spring type suspensions, or other suspension systems. Further, the vehicle suspension assembly 10 may be pre-assembled and then attached to the associated frame rails 14 as a modular unit.

In the foregoing description it will be readily appreciative of those skilled in the art that modifications may be made to the invention without departing from the concepts as disclosed herein. Such modifications are to be considered as included in the following claims, unless the claims by their express language state otherwise.

The invention claimed is:

1. A vehicle suspension assembly, comprising:
a first mounting bracket adapted to couple to a vehicle frame assembly;
a first trailing arm having a first end pivotably coupled to the first mounting bracket, and a second end;
a second mounting bracket adapted to couple to the vehicle frame assembly;
a second trailing arm having a first end pivotably coupled to the second mounting bracket, and a second end;
an axle member having a first end operably coupled to the second end of the first trailing arm and a second end operably coupled to the second end of the second trailing arm, the axle member configured to support a tire;
a pneumatic actuator operably coupled to at least one of the first trailing arm and the second trailing arm and operable between an inflated position configured to lift the tire away from a ground surface and a deflated position configured for the tire to contact the ground surface; and
a lever arm operably coupling the pneumatic actuator and the at least one of the first trailing arm and the second trailing arm, wherein the lever arm abuts the at least one of the first trailing arm and the second trailing arm when the pneumatic actuator is in the inflated position, and wherein the lever arm is spaced from the at least one of the first trailing arm and the second trailing arm when the pneumatic actuator is in the deflated position thereby decoupling the pneumatic actuator from the at least one of the first trailing arm and the second trailing arm when the pneumatic actuator is in the deflated position.

2. The vehicle suspension assembly of claim 1, wherein the lever arm is pivotably coupled to at least one of the first mounting bracket and the second mounting bracket.

3. The vehicle suspension assembly of claim 1, wherein the pneumatic actuator comprises at least one diaphragm arrangement.

4. The vehicle suspension assembly of claim 3, wherein the at least one diaphragm arrangement includes a pair of diaphragm arrangements linearly aligned with one another.

5. The vehicle suspension assembly of claim 1, wherein the lever arm abuts an underside of the trailing arm when the pneumatic actuator is in the inflated position.

6. The vehicle suspension assembly of claim 1, wherein the at least one of the first trailing arm and the second trailing arm includes an outwardly-extending lug portion, and wherein the lever arm abuts the lug portion when the pneumatic actuator is in the inflated position and is spaced from the lug portion when the pneumatic actuator is in the deflated position.

7. The vehicle suspension assembly of claim 6, wherein the lug portion is integral with the at least one of the first trailing arm and the second trailing arm.

8. The vehicle suspension assembly of claim 1, wherein the pneumatic actuator is configured to be positioned outboard of a vehicle frame rail.

9. The vehicle suspension assembly of claim 1, wherein the vehicle suspension assembly comprises a steer axle assembly.

10. A vehicle suspension assembly, comprising:
a mounting bracket adapted to couple to a vehicle frame assembly;
a trailing arm having a first end pivotably coupled to the first mounting bracket, and a second end;
an axle member coupled to the second end of the trailing arm, the axle member configured to support a tire;
an actuator operably coupled to the trailing arm and operable between a first state configured to lift the tire away from a ground surface and a second state configured for the tire to contact the ground surface; and
an actuator arrangement configured to move from a first position where the actuator arrangement couples the actuator to the trailing arm when the actuator is in the first state, and a second position where the actuator arrangement uncouples the actuator from the trailing arm when the actuator is in the second state;
wherein the vehicle suspension assembly comprises a steer axle assembly.

11. The vehicle suspension assembly of claim 10, wherein the actuator comprises a pneumatic actuator, and wherein the first state of the actuator includes an inflated position and the second state of the actuator includes a deflated position.

12. The vehicle suspension assembly of claim 11, wherein the actuator comprises at least one diaphragm arrangement.

13. The vehicle suspension assembly of claim 12, wherein the at least one diaphragm arrangement includes a pair of diaphragm arrangements linearly aligned with one another.

14. The vehicle suspension assembly of claim 10, wherein the actuator arrangement comprises a lever arm.

15. The vehicle suspension assembly of claim 14, wherein the lever arm is pivotably coupled to the mounting bracket.

16. The vehicle suspension assembly of claim 14, wherein the lever arm abuts an underside of the trailing arm when the actuator is in the first state.

17. The vehicle suspension assembly of claim 10, wherein the trailing arm includes an outwardly-extending lug portion, and wherein the actuator arrangement abuts the lug portion when the actuator is in the first state and is spaced from the lug portion when the actuator is in the second state.

18. The vehicle suspension assembly of claim 17, wherein the lug portion is integral with the trailing arm.

19. The vehicle suspension assembly of claim 10, wherein the actuator is configured to be positioned outboard of a vehicle frame rail.

20. A vehicle suspension assembly, comprising:
an attachment member adapted to couple to a vehicle frame assembly;
a support member having a first portion coupled to the attachment member, and a second portion;
an axle member coupled to the second portion of the support member, the axle member configured to support a tire;
an actuator operably coupled to the support member and operable between a first state configured to lift the tire away from a ground surface and a second state configured for the tire to contact the ground surface; and
an actuator arrangement configured to move from a first position where the actuator arrangement couples the actuator to the support member when the actuator is in the first state, and a second position where the actuator arrangement uncouples the actuator from the support member when the actuator is in the second state such that vertical movement of the axle member is not transmitted to the actuator when the actuator arrangement is in the second position;
wherein the first portion of the support member includes a first end of the trailing arm that is pivotably coupled to the mounting bracket, and wherein the second portion of the support member includes a second end of the trailing arm that is coupled to the axle member.

21. The vehicle suspension assembly of claim 20, wherein the attachment member includes a mounting bracket, and wherein the support member includes a trailing arm.

22. The vehicle suspension assembly of claim 21, wherein the trailing arm includes an outwardly-extending lug portion, and wherein the actuator arrangement abuts the lug portion when the actuator is in the first state and is spaced from the lug portion when the actuator is in the second state.

23. The vehicle suspension assembly of claim 22, wherein the lug portion is integral with the trailing arm.

24. The vehicle suspension assembly of claim 20, wherein the actuator arrangement comprises a lever arm.

25. The vehicle suspension assembly of claim 24, wherein the lever arm is pivotably coupled to the mounting bracket.

26. The vehicle suspension assembly of claim 24, wherein the lever arm abuts an underside of the trailing arm when the actuator is in the first state.

27. The vehicle suspension assembly of claim 20, wherein the vehicle suspension assembly comprises a steer axle assembly.

28. The vehicle suspension assembly of claim 20, wherein the vehicle suspension assembly is a modular arrangement.

29. A vehicle suspension assembly, comprising:
an attachment member adapted to couple to a vehicle frame assembly;
a support member having a first portion coupled to the attachment member, and a second portion;
an axle member coupled to the second portion of the support member, the axle member configured to support a tire;
an actuator operably coupled to the support member and operable between a first state configured to lift the tire away from a ground surface and a second state configured for the tire to contact the ground surface; and
an actuator arrangement configured to move from a first position where the actuator arrangement couples the actuator to the support member when the actuator is in the first state, and a second position where the actuator arrangement uncouples the actuator from the support member when the actuator is in the second state such that vertical movement of the axle member is not transmitted to the actuator when the actuator arrangement is in the second position;
wherein the actuator comprises a pneumatic actuator, and wherein the first state of the actuator includes an inflated position and the second state of the actuator includes a deflated position.

30. The vehicle suspension assembly of claim 29, wherein the actuator comprises at least one diaphragm arrangement.

31. The vehicle suspension assembly of claim 30, wherein the at least one diaphragm arrangement includes a pair of diaphragm arrangements linearly aligned with one another.

* * * * *

UNITED STATES PATENT AND TRADEMARK OFFICE
CERTIFICATE OF CORRECTION

| | | |
|---|---|---|
| PATENT NO. | : 10,843,517 B2 | Page 1 of 2 |
| APPLICATION NO. | : 15/913273 | |
| DATED | : November 24, 2020 | |
| INVENTOR(S) | : Marc R. Johnson | |

It is certified that error appears in the above-identified patent and that said Letters Patent is hereby corrected as shown below:

In the Specification

Column 1, Line 42:
"configure" should be – configured –

Column 1, Line 58:
"fame" should be – frame –

Column 3, Line 31:
"comprise" should be – comprises –

Column 3, Line 52:
After "shown)" insert -- , --

Column 3, Line 56:
Delete "a"

Column 4, Line 59:
Delete "to" (2nd occurrence)

Column 5, Line 20:
"previous" should be – previously –

Column 5, Line 56:
Delete "to" (2nd occurrence)

Column 6, Lines 10-11:
"appreciative of" should be – appreciated by –

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,843,517 B2

In the Claims

Column 7, Claim 10, Line 20:
Delete "and"

Column 7, Claim 10, Line 26:
After "state;" insert -- and --

Column 7, Claim 20, Line 67:
Delete "and"

Column 8, Claim 20, Line 9:
After "position;" insert -- and --

Column 8, Claim 29, Line 48:
Delete "and"

Column 8, Claim 29, Line 57:
After "position;" insert -- and --